Dec. 27, 1927.

C. C. AVERY

DUMPING APPARATUS

Filed March 11, 1922 4 Sheets-Sheet 1

1,654,032

INVENTOR.

BY

ATTORNEYS.

Dec. 27, 1927.

C. C. AVERY 1,654,032

DUMPING APPARATUS

Filed March 11, 1922     4 Sheets-Sheet 2

Cruthey C. Avery     INVENTOR.

BY

Parsons & Bodell     ATTORNEYS.

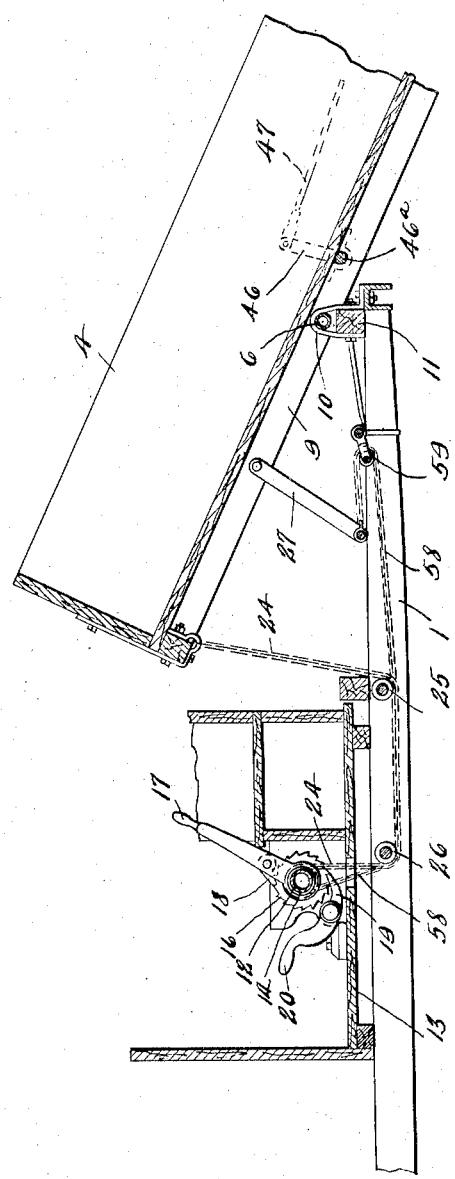

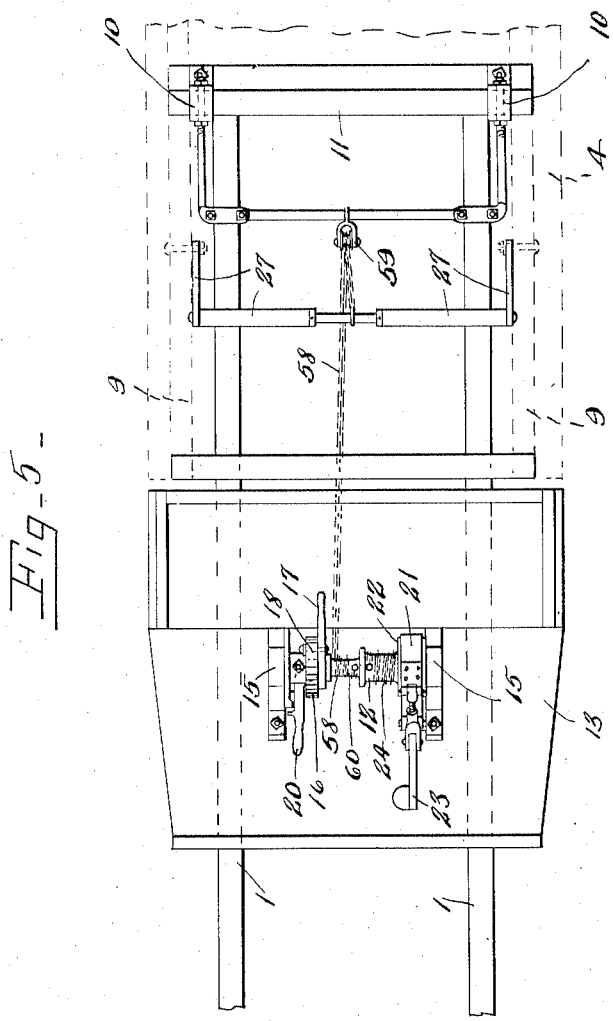

Patented Dec. 27, 1927.

1,654,032

UNITED STATES PATENT OFFICE.

COURTNEY C. AVERY, OF AUBURN, NEW YORK, ASSIGNOR TO EAGLE WAGON WORKS, OF AUBURN, NEW YORK, A CORPORATION OF NEW YORK.

DUMPING APPARATUS.

Application filed March 11, 1922. Serial No. 542,971.

This invention relates to dumping apparatus, as dumping trucks or wagons, and has for its object means for controlling the dumping of the box or body, which means is particularly simple in construction, economical in manufacture, and highly efficient and durable in use; and especially free from the complexities usually embodied in dumping apparatus used on motor trucks and the like. It more particularly has for its object, means for controlling the dumping of the body by gravity and returning the body to its normal or horizontal position and also means for preventing the return of the body when dumping when the weight of the load at the discharge or lower end of the body becomes less than the weight on the higher side of the axis of the body.

The invention consists in the novel features and in the combinations and constructions hereinafter set forth and claimed.

In describing this invention, reference is had to the accompanying drawings in which like characters designate corresponding parts in all the views.

Figure 3 is a detail view of one of the brackets for the hinge pin of the end gate.

Figure 4 is a view similar to Figure 1, embodying another form of my invention.

Figure 5 is a plan view of parts seen in Figure 4.

Figure 1:
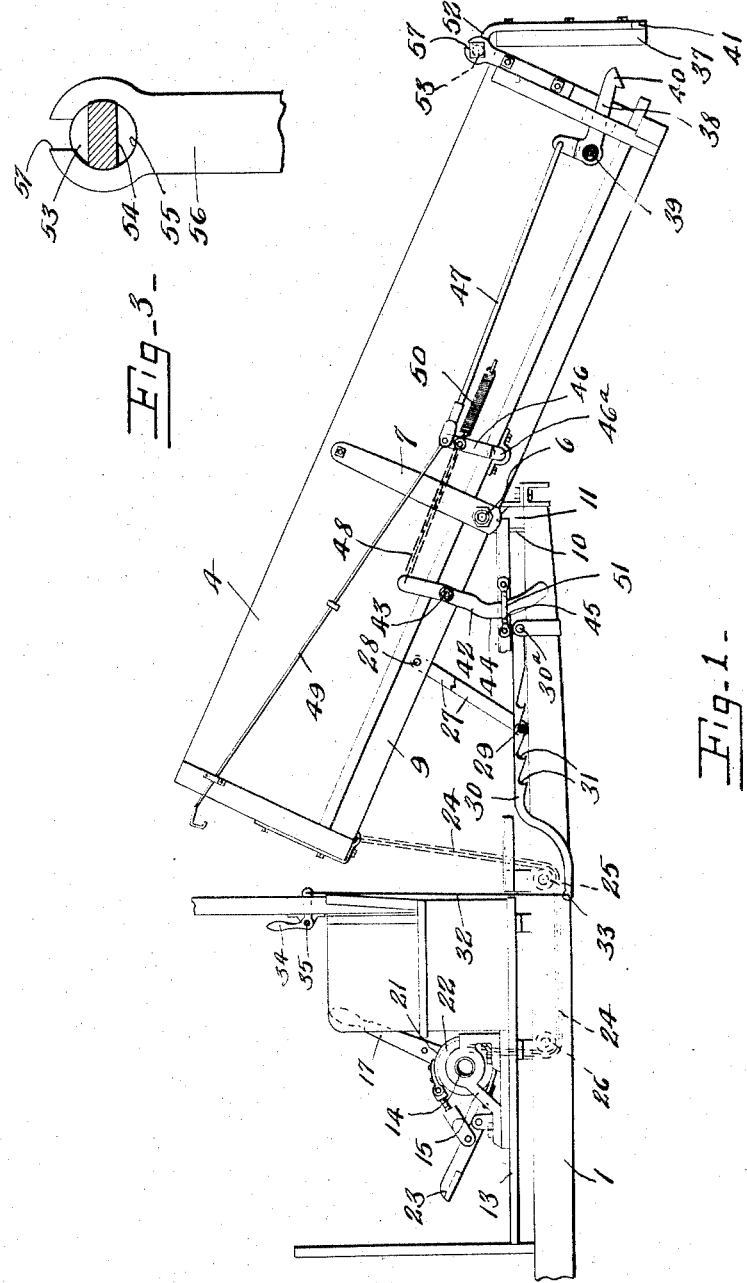
Figure 1 is a side elevation of the truck body embodying my invention, parts being omitted.

This dumping apparatus comprises generally a frame and dumping body pivoted to the frame to tilt about its axis preferably by the weight of the load toward the discharge or rear end of the body, means for controlling the dumping of the body by gravity and returning the body to its normal or horizontal position, and means for holding the body when dumping from returning toward its normal or horizontal position under the influence of the weight of the load on the higher end of the body, in case the portion of the load in the higher end of the body overbalances the weight at the discharge or lower end of the body.

1 designates a truck frame which may be of any suitable form, size and construction, it being mounted upon the usual rear driving wheels and front steering wheels not shown.

4 is a dumping body which is pivoted at 6 between its ends to the frame near the rear end thereof so that the rear end of the body can tilt downwardly behind the frame 1.

As here illustrated, the body is provided with brackets 7 on opposite sides thereof and the pivot 6 is a shaft passing through the brackets 7, the sills 9 of the frame of the body 4 and through bearings 10 of the bolster, these bearings are here shown as straps U-shaped in general form and having their opposite arms embracing the bolster 11 and their intermediate portion extending over the shaft or pivot 6. The shaft or pivot 6 is normally located at one side of the centre of the body 4 toward the front end of the body, so that normally the load tends to tilt the rear end of the body downwardly and dump the load.

The means for controlling the dumping of the body by gravity, as here illustrated, is a windlass comprising a winding drum 12 mounted in front of the body and preferably on the floor of the cab 13 of the body, a cable winding on the drum and connected to the dumping body, and operating and controlling means for the drum. The drum 12 has a shaft or axle 14 mounted in a suitable frame 15, the shaft having a ratchet wheel 16 thereon. An operating lever 17 is loosely mounted on the shaft and carries a dog or pawl 18 coacting with the ratchet wheel 16. Also a dog or pawl 19 coacts with the ratchet wheel 16 to hold the ratchet wheel and the drum 12 from retrograde movement. The dog 19 is connected to a suitable hand lever pedal 20 by which it is moved out of its operative position to permit the drum to unwind. The drum is controlled in its unwinding movement, during the dumping of the load, by a brake, here shown as a brake band 21 enclosing a brake drum 22 rotatable with the shaft 14 or the drum 12, this brake band 21 being applied to the brake drum by means of a suitable lever or pedal 23. The cable or chain 24 is connected at one end to the front end of the body 4 and at its other end to the drum to wind thereon, and this chain is adjustably connected in any suitable manner to the front end of the body 4 in order to regulate the effective length of the chain and hence the maximum angle of inclination of the body 4.

Obviously, when the dog 19 is released by operating the lever 20, the drum 12 will unwind owing to the dumping of the body 4 by the weight of the load in the rear end thereof, and in order to control or prevent the body from dumping too quickly, or for permitting it to dump slowly to distribute the load evenly as in road grading work, the lever 23 may be operated to apply the brake band 21 to the brake drum 22 with more or less friction as required. The chain 24 passes over suitable pulleys 25, 26.

Figure 2:
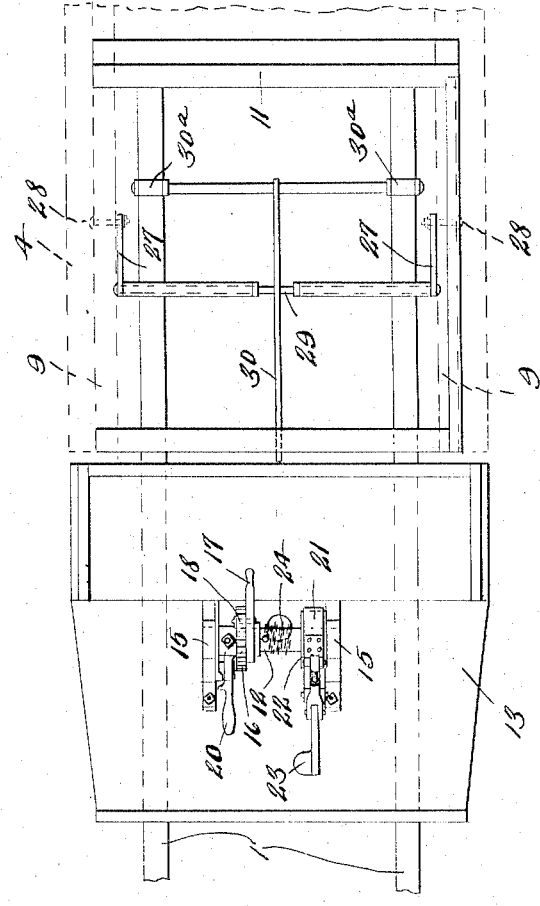
Figure 2 is a plan view, the body being broken away.

The means for holding the dumping body 4 from returning to its normal or horizontal position when dumping as when the front end of the body becomes heavier than the rear or discharge end comprises a folding brace or leg 27 movable with the body in different inclinations as the rear portion of the body 4 elevates, the brace being interposed between the body and the frame 1, and means for holding the brace from retrograde movement. As here illustrated, the brace 27 is pivoted at 28, to the portion of the body in front of the pivot 6, is normally arranged in a horizontal position along the sills of the frame 1, of the truck, and is movable on its pivot 28 into different inclinations as the body 4 tilts into different inclinations. As here illustrated, this brace comprises opposing parallel arms and a cross bar 29 near the free ends of the arms, the ends of the cross bar sliding on the side sills of the frame 1, and the means for holding the brace at different inclinations and from retrograde movement coacts with the cross bar. The holding means, as shown in Figures 1 and 2, comprises a rack or a latch 30 having a series of ratchet teeth 31 coacting with the cross bar 29, the latch being pivoted at any suitable point at 30ᵃ to the frame 1 and having operating means connected to its front end, which means are operable from within the cab. The operating means, as here illustrated, comprises a link 32 pivoted at 33 at its lower end to the front end of the latch 30, and having its upper end connected to an operating lever 34 in the form of a bell crank pivoted at 35 to the wall of the cab, the handle of this lever being located in the cab.

Obviously, as the body 4 tilts the brace 27 will move from horizontal position into different inclined positions, and the cross bar 29 thereof will ratchet into engagement with the teeth 31 of the latch 30, as the body moves into higher inclines. Upon operating the lever 34 to move the latch 30 out of engagement with the cross bar 29, the body will return to its horizontal position upon winding of the drum 12 and during such movement the brace 27 will move on its pivot 28 into horizontal position, the cross bar sliding along the side sills of the frame 1. The body 4 is provided with an outwardly swinging end gate 37 hinged at its upper end and having its lower end swingable outwardly as the body 4 tilts. This gate 37 is normally locked in its closed position, and means is provided for unlocking the gate as the body 4 tilts into dumping position and to lock as the body tilts into its normal position.

38 designates the latch for holding the end gate 37 in its locked position, the latch 38 being here shown as an angle lever pivoted at 39 and having a latch head 40 at one end for coacting with the lug 41 of the gate. The latch is automatically operated by an actuator or cam lever 42 pivoted to the body at 43 and having a cam portion 44 coacting with a shoulder 45 on the truck frame, and suitable connections between the cam lever 42 and the latch 38. The connections, as here illustrated, include a lever 46 pivoted to the side of the body, a link 47 for connecting the lever and the latch 38, and a link or chain 48 connecting the cam lever 42 and the lever 46. Also the lever 46 may be operated by a manually operated device as a link 49 connected thereto and extending along the body to the front end thereof into position to be operated from the cab. A suitable spring 50 tends to move the latch into its operative position, said spring being connected to the lever 46.

There is a latch 38, lever 46, and link 47, on each side of the body 4, and the levers 46, are mounted to rock in unison on a common pivot 46ᵃ which is a rock shaft extending transversely of the body.

The shoulder 45 is one end of a slot formed by a strap or clip 51 secured to the side sill of the frame 1 of the truck.

As the body dumps, the cam lever 42 in moving along the shoulder 45 is operated so that its lower end moves rearwardly and its upper end forwardly and this movement is transmitted to the latch 38 and it is moved out of engagement with the lug 41 on the end gate 37.

The reverse of this operation takes place when the body 4 is being moved to its horizontal position and the spring 50 moves the latch into latching position. In case the latch 38 does not engage the lug 41 on the end gate, the latch 38 may be manually operated by the link 49.

The end gate 37 is here shown as having hinge leaves 52 mounted upon a hinge pin or shaft 53 having a flattened portion 54 mounted in round bearings 55 provided in brackets 56 on the body 4; these brackets 56 having slots 57 leading from the bearings 55, the flattened portions 54 are normally turned so that the shaft 53 cannot pass out through the slots. When it is desired to remove the end gate 37 the shaft 53 may be turned so that its flat portions 54 are in line with the slots 57 and the shaft 53 lifted out of the bearings carrying the end gate 37 therewith.

As shown in Figures 4 and 5, the brace 27 instead of being held from retrograde movement by the latch or rack 30 may be held from such movement by a chain or cable 58 connected to the cross bar 29 and running over a pulley 59 in rear of the cross bar, one run of the chain extending forwardly and winding upon a drum or arbor 60 on the shaft 14, this chain or cable 58 winding on the arbor 60 in a direction opposite to that in which the chain 24 winds on the drum 12; so that the chain 24 is being wound while the chain 58 pays out and vice versa.

This dumping body and mechanism is particularly advantageous in that it can be readily applied to standard trucks and does not embody extensive complexities, such as power hoists and the like.

What I claim is:

1. In a dumping apparatus, a frame, a dumping body pivoted to the frame to tilt about its axes by the weight of the load toward the discharge end of the body, and means for holding the body from returning to its normal position when the weight during dumping of the load is greater at the higher end of the body than at the discharge end, said means comprising a brace pivoted at one end to the body and slidable on the frame at its other end, and movable into an inclined position as the body dumps, and means for holding the brace from retrograde movement as the body dumps, the last-mentioned means comprising a rack carried by the frame, and the brace coacting with the rack, the teeth of the rack being formed to permit ratcheting of the brace along the rack as the brace moves into different inclinations.

2. In a dumping apparatus, a frame, a dumping body pivoted to the frame to tilt about its axis by the weight of the load toward the discharge end of the body, and means for holding the body from returning to its normal position when the weight during dumping of the load is greater at the higher end of the body than at the discharge end, said means comprising a brace pivoted at one end to the body and slidable on the frame at its other end, and movable into an inclined position as the body dumps, and means for holding the brace from retrograde movement as the body dumps, the last-mentioned means comprising a rack carried by the frame, and the brace coacting with the rack, the teeth of the rack being formed to permit ratcheting of the brace along the rack as the brace moves into different inclinations, and means for disengaging the rack from said brace.

3. In a dumping apparatus, the combination of a frame, a dumping body pivoted to the frame to tilt by the weight of the load toward the discharge end of the body, means for holding the body from returning to its normal position comprising a folding brace interposed between the body and the frame arranged to fold into a substantially horizontal position when the body is in its normal position and to move into inclined position as the body dumps, said brace comprising opposite arms and a cross bar connecting the arms, and means coacting with the cross bar to hold the brace in its various inclined positions during dumping of the body.

4. In a dumping apparatus, the combination of a frame, a dumping body pivoted to the frame to tilt by the weight of the load toward the discharge end of the body, and means for holding the body from returning to its normal position comprising a folding brace between the frame and the body, the brace being pivoted to the body and arranged to fold into horizontal position when the body is in its normal position and to move on its pivot into inclined positions as the body dumps, said brace comprising opposite arms and a cross bar connecting the arms and means coacting with the cross bar to hold the brace in its various inclined positions during dumping of the body, the last-mentioned means comprising a latch having a plurality of ratchet teeth coacting with the cross bar, substantially as and for the purpose set forth.

5. In a dumping apparatus, a frame, a dumping body pivoted to the frame to tilt about its axis by the weight of the load toward the discharge end of the body, means for holding the body from returning to its normal position when the weight during the dumping of the load is greater at the higher end of the body than at the discharge end, said means comprising a horizontally extending rack carried by the frame and extending under the body in a direction lengthwise thereof, and a brace pivoted to the body and movable along the rack during the dumping of the body and means for shifting the rack out of engagement with the brace to permit the body to return to its normal position.

In testimony whereof, I have hereunto signed my name, at Auburn, in the county of Cayuga, and State of New York, this 27th day of February, 1922.

COURTNEY C. AVERY.